Figure 4:
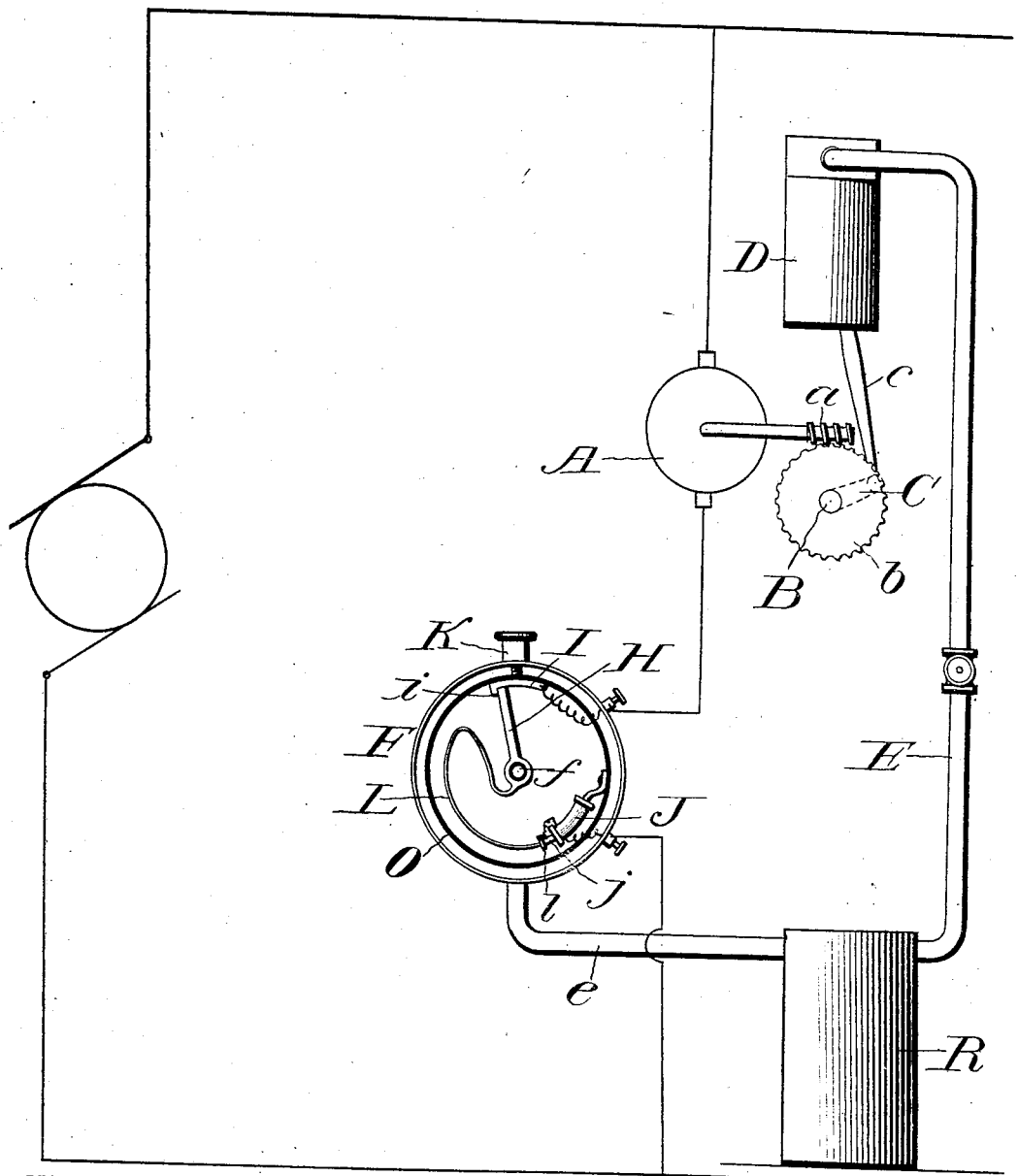

No. 765,039. PATENTED JULY 12, 1904.
W. J. PUGH.
PRESSURE CONTROLLED ELECTRIC SWITCH.
APPLICATION FILED NOV. 16, 1903.
NO MODEL. 2 SHEETS—SHEET 1.
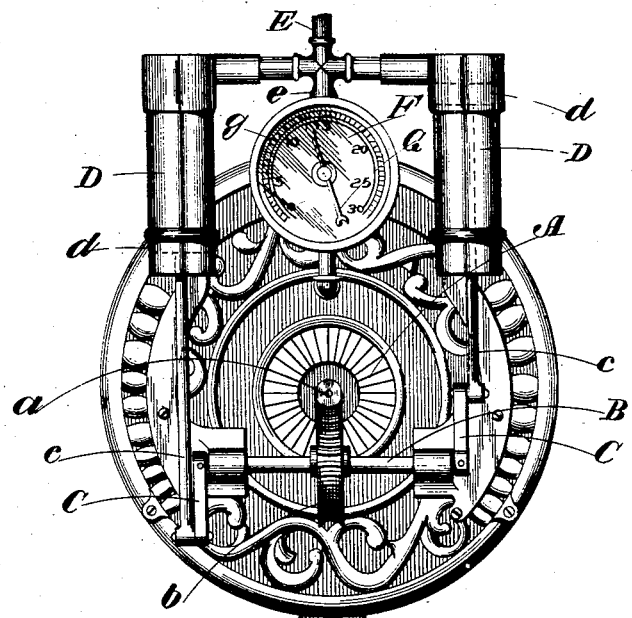
*Fig. 1*
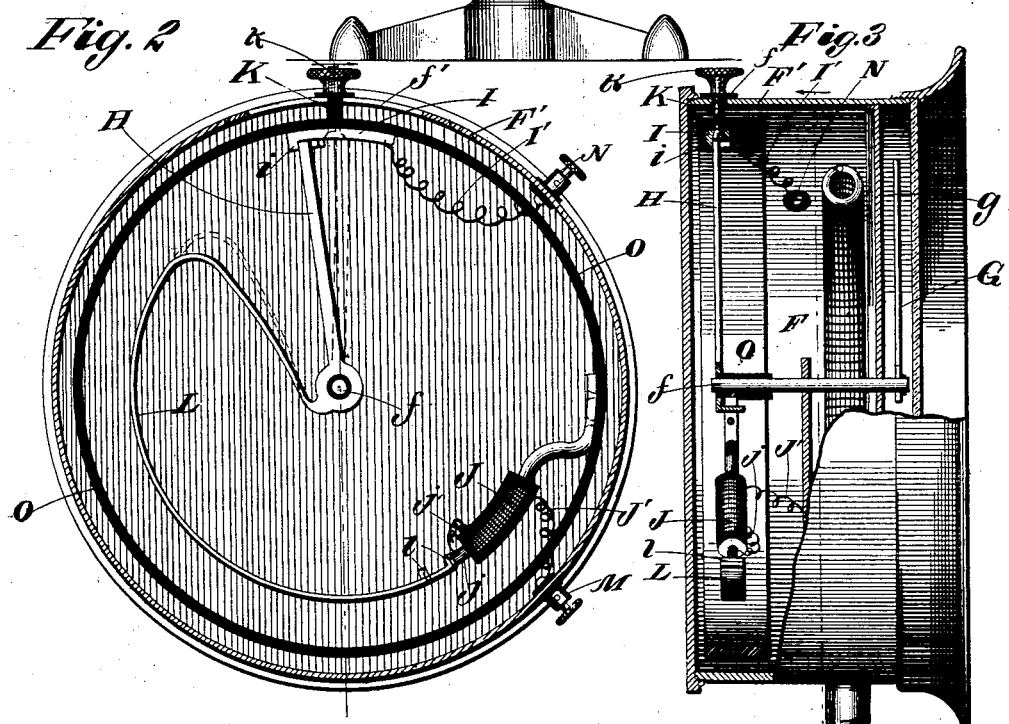
*Fig. 2*   *Fig. 3*
WITNESSES
C. Edw. Duffey
James R. Mansfield.
INVENTOR
William J. Pugh.
By Alexander & Dowell.
Attorneys No. 765,039. Patented July 12, 1904.

UNITED STATES PATENT OFFICE.

WILLIAM J. PUGH, OF DAVENPORT, IOWA, ASSIGNOR, BY DIRECT AND MESNE ASSIGNMENTS, TO AUTOMATIC ELECTRIC PUMP COMPANY, OF DAVENPORT, IOWA.

PRESSURE-CONTROLLED ELECTRIC SWITCH.

SPECIFICATION forming part of Letters Patent No. 765,039, dated July 12, 1904.

Application filed November 16, 1903. Serial No. 181,341. (No model.)

*To all whom it may concern:*

Be it known that I, WILLIAM J. PUGH, of Davenport, in the county of Scott and State of Iowa, have invented certain new and useful Improvements in Pressure-Controlled Electric Switches; and I hereby declare that the following is a full, clear, and exact description thereof, reference being had to the accompanying drawings, which form part of this specification.

This invention is an improved automatic switch-controller or circuit maker and breaker especially designed for use in connection with air-compressors actuated by electric motors and in which the switch is operated by a pressure gage or indicator and when the pressure falls below a certain desired amount the electric circuit is closed and the motor started in operation pumping the air and when the desired pressure is obtained the circuit is broken by a snap action, so that danger of arcing is obviated.

I have shown the device in connection with an air-pressure gage; but the circuit making and breaking devices are applicable to other kinds of gages having a rotatable indicator-finger, and therefore I do not confine my invention to use with air-compressors or air-gages.

The novel features of the invention for which protection is desired are set forth in the claims, and I will now describe the invention with reference to the accompanying drawings, in which—

Figure 1 is a front view of the complete device as adapted to one form of air-compressing apparatus. Fig. 2 is an enlarged view of the circuit making and breaking devices. Fig. 3 is a vertical section through Fig. 2. Fig. 4 is a diagram of the apparatus, showing the electrical connections.

In the drawings, A represents an electric motor of any desired type, on the armature-shaft of which is a worm $a$, meshing with a worm-gear $b$ on a transverse shaft B, having opposite cranks C at its ends, respectively connected by pitmen $c$ to pistons $d$ within cylinders D, from which the compressed air may be conducted to a suitable reservoir R through pipes E, which connect with a pressure-gage F by a branch $e$, as shown, said pressure-gage being of any desired construction and having a rotatable shaft $f$, carrying an indicator-finger G, which moves past the index $g$ of the gage, as usual.

Within the gage-casing F', I place the circuit making and breaking devices, utilizing shaft $f$ as a part thereof, said devices being constructed as follows:

On shaft $f$ is fixed a finger H, which is adapted to make electrical contact with a metallic contact-piece I, attached to a ring O, preferably of non-conducting material, suspended in the casing by means of a threaded pin K, passing through a slot $f'$ in the casing and provided with a thumb-nut $k$ on its outer end, by which means the ring can be rotatably adjusted in the casing and fixed when adjusted. The contact I has a lug $i$, which will catch the end of finger H as it moves backward, and thus close the circuit, as hereinafter described.

Preferably finger H is insulated from shaft G, as shown, and to the hub of finger H is attached a spring L, which is bent into a long C shape, so as to give it considerable elasticity and freedom of movement within the ring O. The free end of spring L carries an armature $l$ of preferably soft iron, which is adapted to contact with the core $j$ of an electromagnet J, which core may extend through the magnet and be fastened at its rear end to ring O, as shown, to support the magnet on the ring, and the magnet will always remain a uniform distance from contact I no matter in what position the ring O is adjusted. The core $j$ in this instance is utilized as an electrical contact to make connection with spring L, said core being connected by a wire $j''$ with the winding of the magnet J, the other terminal of which is connected by a wire J' with a binding-post M, suitably located on but insulated from the casing.

The contact-piece I is similarly connected by a wire I' with a binding-post N, attached to a suitable point on the casing. The binding-posts N M are respectively connected in the motor-circuit, as indicated in Fig. 4, so that when the circuit is broken between spring L and magnet J by the separation of armature l from core j the motor will be thrown out of action. Similarly, the motor will be thrown out of action if contact is broken between finger H and piece I. By properly adjusting ring O the device can be made to put the motor in operation whenever the pressure falls below the desired point by automatically closing the circuit. The magnet J, moreover, is so located on ring O that when finger H is resting against lug i on piece I the armature l is thrown into contact with core j and the electrical circuit is closed, as the armature l and core j will remain in contact until finger h has moved away from lug i, but not entirely out of contact therewith; but when it moves sufficiently to overcome the attraction between armature l and core j the spring L snaps the armature quickly from the magnet, as indicated in dotted lines, thus breaking the circuit instantaneously without sparking. As the pressure in the gage lessens the finger G moves back toward the zero position and in so doing moves finger H toward lug i and armature l toward core j until contact is made between armature l and core j, which contact may be hastened by residuary magnetism in the core and armature. As soon as the contact is made the electric circuit is established and the motor will run until finger H has moved sufficiently away from lug i to cause the resilient pull of spring L to snap armature l from the magnet-core, which breaks the circuit instantaneously without sparking. Obviously the switch connections could be utilized with steam or heat gages if they contain a rotatable shaft to which the finger H and spring L can be attached.

Having thus described my invention, what I therefore claim as new, and desire to secure by Letters Patent thereon, is—

1. In combination, a contact-piece, an electromagnet, a rotatable shaft, a contact-finger attached to said shaft and adapted to make electrical contact with the contact-piece; and a spring attached to said shaft, adapted to make electrical contact with the electromagnet, substantially as described.

2. In combination with a gage or indicator having a rotatable shaft, a contact-finger attached to said shaft adapted to make electrical contact with a contact; and a spring attached to said shaft adapted to make contact with another contact, said contacts being connected to opposite poles of an electric circuit.

3. In combination, a rotatable shaft; a contact-finger and a contact-spring attached to said shaft, a contact-piece adapted to be contacted by said finger, an electromagnet adapted to be contacted by said spring, and electric circuit connections with said contact-piece and said magnet respectively, the magnet forming part of the circuit, substantially as described.

4. The combination of a contact-finger and a contact-spring attached to a common shaft, a contact-piece adapted to be contacted by said finger, and a second contact-piece adapted to be contacted by said spring, said contact-pieces being relatively fixed but adjustable relatively to said finger and spring, substantially as described.

5. In combination with a gage having a rotatable shaft, a conducting-finger and a conducting-spring attached to said shaft, a contact-piece adapted to be contacted by said finger, and an electromagnet forming part of the electric circuit adapted to be contacted by said spring; said contact-piece and said magnet-piece being fixed on an adjustable support within the gage-casing, substantially as described.

6. In combination, an electric motor and air-compressors actuated thereby, and a pressure-gage having an indicating-finger mounted on a rotatable shaft; with a contact-finger and a contact-spring on said shaft, a contact-piece adapted to be contacted by said finger, an electromagnet adapted to be contacted by the spring, said magnet forming part of the electric circuit, substantially as described.

7. The combination of an electric motor, air-compressors actuated thereby and a pressure-gage having an indicating-finger mounted on a rotatable shaft; with a contact-finger and a contact-spring on said shaft, a rotatable ring within the casing surrounding said finger and spring, a contact-piece on said ring adapted to be contacted by said finger, an electromagnet on said ring adapted to be contacted by the spring, said magnet forming part of the electric circuit, and means for adjusting said ring, substantially as and for the purpose described.

In testimony that I claim the foregoing as my own I affix my signature in presence of two witnesses.

WILLIAM J. PUGH.

In presence of—
F. W. NEAL,
D. M. TAYLOR.